Feb. 27, 1962  C. K. GRIEDER  3,023,025
GALLOPING HOBBY HORSE WITH UNITARY DIRECTIONAL CONTROL
Filed March 28, 1960  2 Sheets-Sheet 1
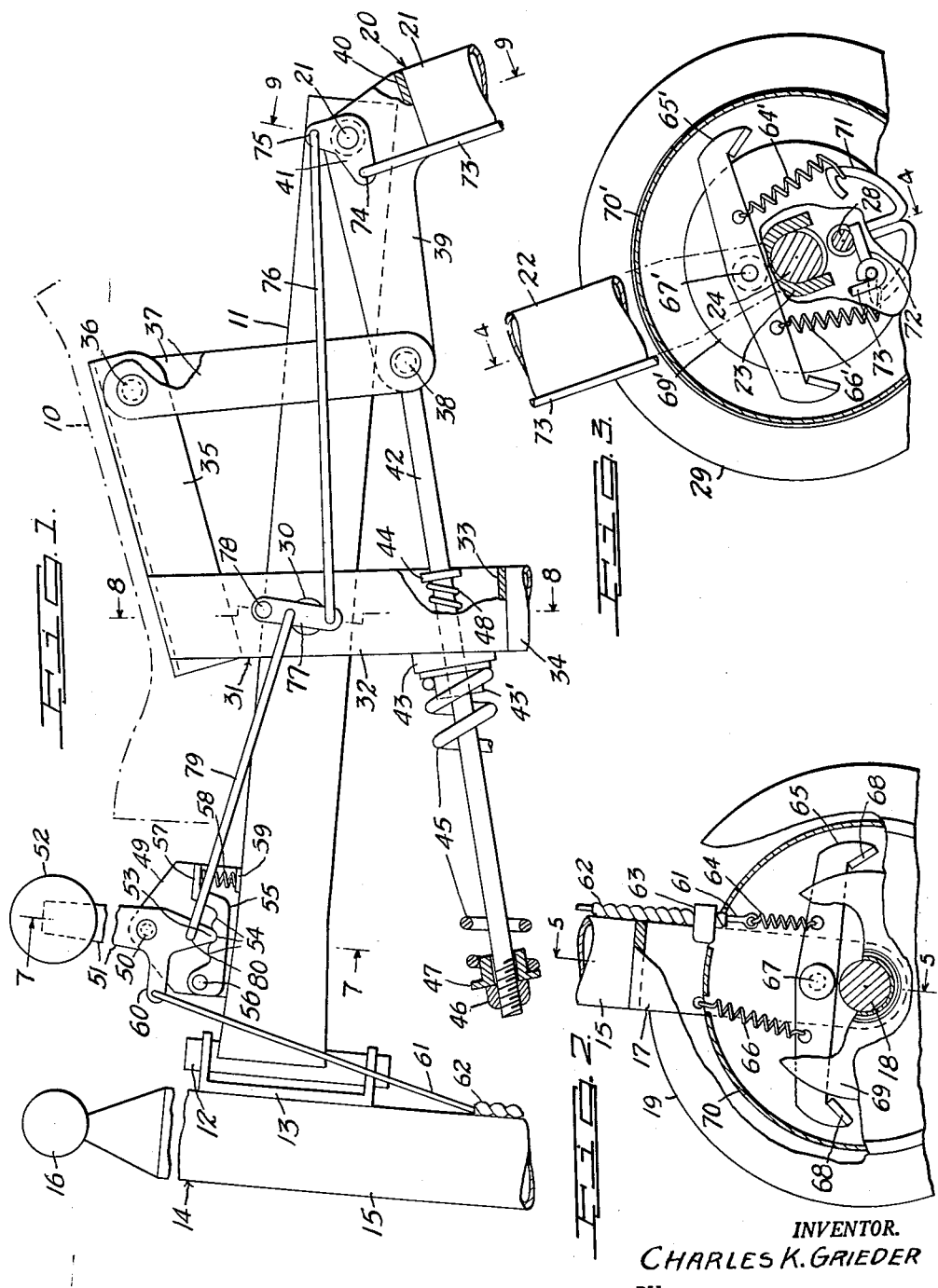
INVENTOR.
CHARLES K. GRIEDER
BY
Howard C. Thompson
ATTORNEY Feb. 27, 1962 C. K. GRIEDER 3,023,025
GALLOPING HOBBY HORSE WITH UNITARY DIRECTIONAL CONTROL
Filed March 28, 1960 2 Sheets-Sheet 2
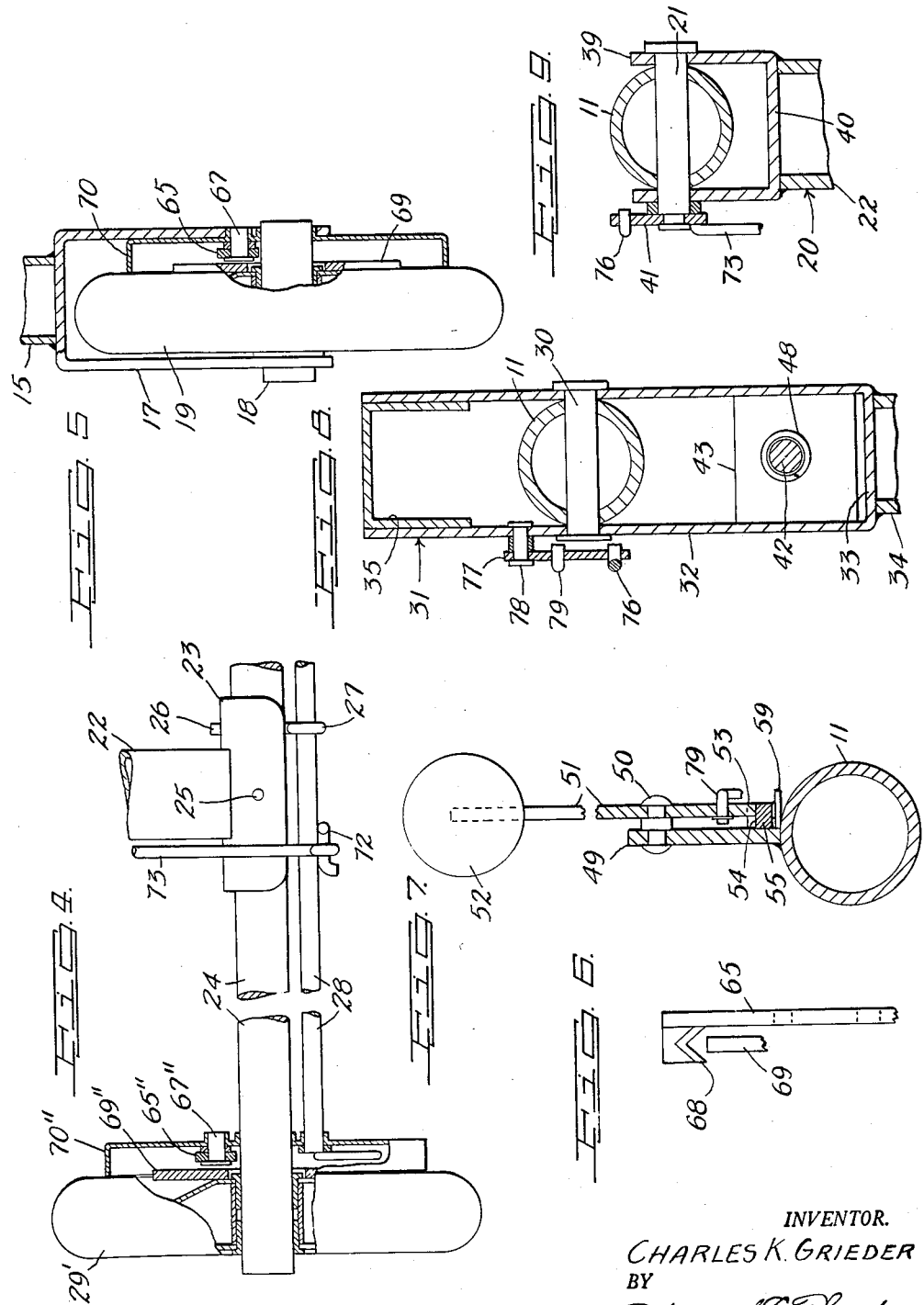
INVENTOR.
CHARLES K. GRIEDER
BY
Howard C. Thompson
ATTORNEY

United States Patent Office 3,023,025
Patented Feb. 27, 1962

3,023,025
GALLOPING HOBBY HORSE WITH UNITARY DIRECTIONAL CONTROL
Charles K. Grieder, 32 Loyola Place, Oakland, N.J.
Filed Mar. 28, 1960, Ser. No. 17,833
12 Claims. (Cl. 280—218)

This invention relates to what I term galloping devices or apparatus characterized to represent different animals and, particularly, horses to create a galloping hobby horse. More particularly, the invention deals with a device of this type and kind employing a unitary manually actuated control arranged adjacent the seat of the device, the control governing forward and reverse progress of the device, as well as maintaining neutral position thereof.

Still more particularly, the invention deals with a control having spring actuated detent means for maintaining the manually operated element of the device in neutral, as well as forward and reverse positions. Further, the invention deals with a manually operated control, wherein the braking means of the rear wheels of the device are actuated through a series of links and levers.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic view of the upper frame portion of a device made according to my invention, indicating in dot-dash lines the outline of the upper portion of a seat and illustrating the upper portion of the manually actuated control in neutral position, parts of the construction being broken away and in section.

FIG. 2 is a veiw of part of the front wheel of the device, with parts of the structure broken away and in section.

FIG. 3 is a small sectional view through the central portion of the rear shaft of the device and illustrating, in section, part of one of the rear wheels to show the braking means therefor.

FIG. 4 is a rear view of the central and one end portion of the rear wheel construction and showing a wheel partially in section along the line 4—4 of FIG. 3, the wheel being at the opposed end of the shaft from the wheel illustrated in FIG. 3 and omitting background showing.

FIG. 5 is a partial section on the line 5—5 of FIG. 2, omitting the background showing and with parts in elevation.

FIG. 6 is a detail view of one end portion of one of the brake shoes illustrating its arrangement with respect to one of the brake discs employed.

FIG. 7 is a section on the line 7—7 of FIG. 1 on an enlarged scale, with part of the construction broken away.

FIG. 8 is a section on the line 8—8 of FIG. 1; and

FIG. 9 is a partial section on the line 9—9 of FIG. 1.

My present invention deals with a device or hobby horse of the type and kind disclosed in my prior application, Serial Number 778,833, filed December 8, 1958, and, in order to simplify the present disclosure, no detail of the horse or other animal or the mechanism characterizing the same are illustrated, except for the outlining of the upper portion of the seat in dot-dash lines at 10 in FIG. 1 of the drawing.

The frame of the device comprises an elongated tubular body member 11, pivoted at its forward end, as indicated at 12, in a yoke 13 welded or otherwise secured to the front leg unit 14 or the post 15 thereof, the upper end of the unit having a transverse handgrip bar 16, facilitating rotation of the unit in steering the device.

Welded or otherwise secured to the lower end of the post 15 is a yoke-shaped frame 17, note FIGS. 2 and 5, supporting a shaft 18, upon which a wheel 19 is rotatably mounted.

To the rear portion of the body 11 is pivoted a rear wheel unit 20, the pivot being illustrated at 21. The tube 22 of the unit 21 supports, at its lower contracted end, an inverted U-shaped shaft coupling plate 23, note FIGS. 3 and 4. This plate is pinned to the shaft 24 of the rear wheel unit, as seen at 25, and another pin is mounted in the shaft, as at 26, having an eye 27, in which a brake operating rod 28 is mounted. Rotatable on the ends of the shaft 24 are two similar rear wheels 29 and, as both wheels are of the same construction, the brief description of one will apply to the other.

Pivoted centrally of the body member 11 on the pivot 30 is a seat supporting frame 31, comprising a U-shaped member 32 supported on the pivot 30, the crosshead member of said member being shown at 33 and to this crosshead is welded or otherwise secured the fender of the device, part only of which is indicated at 34. Welded or otherwise fixed to the upper side members of the frame 31 is an inverted U-shaped member 35, note FIG. 8 of the drawing, supporting a pivot 36 at its rear end, to which a pair of links 37 are pivotally supported. The links 37 are disposed at outer sides of the body member 11 and support, at their lower end, a pivot 38, to the forward end of which a yoke-shaped bracket 39 is also pivoted, the crosshead 40 of the bracket being welded or otherwise fixed to the upper part of the post 21.

The side plates of the bracket are mounted on the pivot 21, as clearly noted in FIG. 9 of the drawing, the pivot 21 extending at one side of the yoke 39 and forms a support for a double arm lever 41.

Also mounted on the pivot 38 is a spring supporting rod 42 slidable in a plate 43 fixed to the forward side edges of the yoke 32, as clearly noted in FIG. 1 of the drawing. Secured to the rod 42 is a disc 44 arranged within the side plates of the yoke 32. A spring 45 seats on a collar 43' adjacent the plate 43, the spring tension being adjusted by a nut 46 in threaded engagement with the end of the rod 42 and operating upon a collar 47. The spring 45 controls normal operation of the hobby horse or device and arranged between the collar 45 and the plate 43 is a buffer spring 48 to check rebound action of the device.

Welded or otherwise fixed to the body member 11 between the seat 10 and pivot 12 is an upstanding plate 49, carrying, at its upper end, a pivot 50 for a manually actuated lever 51, having a rounded handpiece 52 at its upper end, note FIGS. 1 and 7 of the drawing. The lower end of the lever 51 is rounded, as seen at 53 in FIG. 1 of the drawing, to operate in one of three notches 54 in a detent 55 pivoted to the plate 49, as seen at 56 in FIG. 1 of the drawing. The free end of the detent has a raised offset plate 57 forming a seat for the upper end of a spring 58. An extending plate 59 is fixed to the plate 49 and the body member 11 and forms a lower support for the spring 58. The spring 58, at all times, maintains the detent in operative engagement with the end 53 of the lever in support of the lever in the neutral position, as shown in FIG. 1, or, in the forward and reverse operating positions in the notches 54 at either side of the central notch, note FIG. 1. The lever 51 includes an extending arm 60, note FIG. 1.

Coupled with the arm 60 is a flexibe cable 61 which extends downwardly through a supporting tube 62 fixed to the post 15 in any desired manner, the lower end of 62 having a clip support 63 on the yoke 17. The cable 61 is coupled with a spring 64 which, in turn, is coupled with the brake shoe 65 of the front wheel 19. Another spring 66 is fixed to the yoke 17 and to the other end portion of the brake shoe 65, the brake shoe 65 being pivoted, as at 67, to one side of the yoke 17, as clearly illustrated in FIG. 5 of the drawing. The brake shoe 65 has, at its offset ends, V-shaped hardened brake engaging elements 68, one of which is shown in detail in FIG. 6 of the drawing and these elements are adapted to operatively engage a brake disc 69 fixed to the wheel 19.

Mounted on one of the side plates of the yoke 17 is a housing 70 forming a protective covering for the brake mechanism, the housing being cut out for reception and operation of the spring 66 and the cable 61. The brake shoe 65 is shown in its neutrally supported position in FIG. 2 of the drawing, consistent with the showing of the lever 51 in FIG. 1. It will be apparent, however, that, in operation of the lever 51, the shoe 65 can be operated to move the elements 68 at the ends thereof into engagement with the disc 69 in controlling forward and reverse braking of the device or horse.

The structure and method of operation of the braking means of the two rear wheels is substantially the same as with the front wheel construction, except for the manner of operation thereof. Accordingly, in FIGS. 3 and 4 of the drawing, like references will be used in order to simplify the description.

Considering FIG. 3 of the drawing which can be said to represent the righthand rear wheel as viewed from the rear of the device, 64', 66' can represent the two springs coupled with the brake shoe 65', generally similar to the shoe 65. 67' is the pivot for the shoe, the pivot being arranged in the housing 70', the housing being welded or otherwise fixed to the shaft 24. The brake disc, in connection with which the shoe 65' operates, is indicated at 69'.

Now, if we turn, for a moment to the showing in FIG. 4 of the drawing, here the lefthand wheel is indicated at 29', the brake disc at 69'', the housing at 70'', the brake shoe pivot at 67'', part of the brake shoe at 65''. Here, it is well to mention that, in FIGS. 4 and 5 of the drawing, background showing of the springs is omitted for sake of clarity. The brake operating rod 28 has a bearing support in each of the housings 70', 70'' and supported on the ends of the rod, within the housings 70', 70'', are offset curved spring actuating hook elements 71, one of which is clearly seen in FIG. 3 of the drawing, and the curvatures of the elements 71 are such as to allow the ends of the springs coupled therewith to move along said ends, particularly in downward movement of ends of the shoe 65'. It will be understood that the element 71 is welded or otherwise fixed to the rod 28.

Welded to the rod 28, adjacent the post 22, is a hook-shaped crank finger 72, note FIG. 4, and coupled with the finger 72 is the lower looped end of a brake operating rod 73, as clearly noted in FIG. 3 of the drawing, the upper end of the rod 73 being coupled with one arm of the lever 41, as seen at 74 in FIG. 1 of the drawing.

Coupled with the other arm of the lever, as at 75, is another rod 76 which is pivoted to the lower end of a link 77 pivoted to one side of the yoke-shaped frame 32, as seen at 78, note FIGS. 1 and 8 of the drawing. Also coupled with the link 77 is another rod 79 which is pivoted to the lever 51, as indicated at 80 in FIG. 1 of he drawing.

From the foregoing, it will be apparent that the operation of the brake rod 28 in operation of the shoes 65', 65'' through the springs employed is a positive mechanical operation in the yieldable movement of the brake shoes into operative engagement with the brake discs of the rear wheels.

For purposes of description, the horse may be said to comprise a vehicle, bearing in mind that the wheeled vehicle, including a seat portion, can be of any desired contour or shape and, particularly, where the vehicle can progress forwardly and rearwardly, as with other devices of this type and kind and, at the same time, this progress is produced by vertical reception of the seat portion of the vehicle.

It will be understood that the various rods, links and levers and their arrangement are such as to provide actuation of the brakes of the rear wheels, regardless of what position the wheels are with respect to the body member to, at all times, provide the positive operation of the brake shoes of the rear wheels.

It is possible during operation of the vehicle to move the manual lever to any position in the detents, even though the brake shoe may be in engagement with the brake discs. This is made possible by virtue of the dual spring construction provided at each of the wheels.

Having fully described my invention, what I claim as new and desire to secure by Letters Patent is:

1. A vehicle of the character described, comprising a body member, a front wheel supporting post movably mounted on the forward end of said member, means comprising a U-shaped bracket for supporting a front wheel at the lower portion of said post, a rear dual wheel unit, a frame member with which said unit is coupled, means pivotally supporting the frame member on the rear portion of the body member, seat supporting means pivoted with said body member, brake discs fixed to the front and rear wheels of the vehicles, fixed housings arranged at one side of all of said wheels and concealing said discs, brake shoes pivotally supported in said housings and including at end portions thereof disc engaging elements adapted to operatively engage the periphery of said brake discs in braking said wheels against forward and rearward travel, a pair of coil springs operatively engaging each of said shoes, a manually actuated lever pivotally supported in connection with the body member adjacent the forward end of said body member, and means coupled with said lever and extending to and coupled with one of the springs of the brake shoe of each wheel for moving all of said shoes from a neutral position to forward and rearward braking positions.

2. A vehicle as defined in claim 1, wherein the last named means comprises a flexible cable extending to and coupled with one of the springs of the brake shoe of the front wheel.

3. A vehicle as defined in claim 2, wherein said last named means includes a series of rods, including links and levers for actuating a brake operating rod, and said rod having, at end portions thereof, hook elements coupled with the springs of each of the brake shoes of said rear wheels.

4. A vehicle as defined in claim 3, wherein means is employed adjacent said manually actuated lever for yieldably engaging the lever in support thereof in neutral as well as forward and rearward braking positions.

5. A vehicle of the character described, comprising a body member, a front wheel supporting post movably mounted on the forward end of said member, means comprising a U-shaped bracket for supporting a front wheel at the lower portion of said post, a rear dual wheel unit, a frame member with which said unit is coupled, means pivotally supporting the frame member on the rear portion of the body member, seat supporting means pivoted with said body member, means comprising an adjustable coil spring directly coupled with said frame member and in operative engagement with said seat supporting means for controlling action of the vehicle, brake discs fixed to the front and rear wheels of the vehicle, fixed housings arranged at one side of all of said wheels and concealing said discs, brake shoes pivotally supported in said housings and including at end portions thereof disc engaging elements adapted to operatively engage the periphery of said brake discs in braking said wheels against forward and rearward travel, a pair of coil springs operatively engaging each of said shoes, a manually actuated lever pivotally supported in connection with the body member adjacent the forward end of said body member, and means coupled with said lever and extending to and coupled with one of the springs of the brake shoe of each wheel for moving all of said shoes from a neutral position to forward and rearward braking positions.

6. A brake system for vehicles having front and rear wheels, each wheel having a brake disc fixed thereto, a housing supported adjacent each wheel and concealing said discs, brake shoes pivotally supported in connection with said housings and having elements operatively engaging the periphery of said discs in controlling forward and rearward progress of the vehicle, a pair of coil springs coupled with the brake shoe of each wheel, a manually actuated lever pivotally supported on a frame portion of the vehicle, and means coupled with said lever and in operative engagement with at least one coil spring of each brake shoe simultaneously controlling positioning of the shoes through action of said lever from a neutral to a forward or rearward braking position.

7. A brake system for vehicles having front and rear wheels, each wheel having a brake disc fixed thereto, a housing supported adjacent each wheel and concealing said discs, brake shoes pivotally supported in connection with said housings and having elements operatively engaging the periphery of said discs in controlling forward and rearward progress of the vehicle, a pair of coil springs coupled with the brake shoe of each wheel, a manually actuated lever pivotally supported on a frame portion of the vehicle, means coupled with said lever and in operative engagement with at least one coil spring of each brake shoe simultaneously controlling positioning of the shoes through action of said lever from a neutral to a forward or rearward braking position, and yieldable means operatively engaging said lever for retaining the same in said neutral and forward and rearward positions.

8. A brake system for vehicles having front and rear wheels, each wheel having a brake disc fixed thereto, a housing supported adjacent each wheel and concealing said discs, brake shoes pivotally supported in connection with said housings and having elements operatively engaging the periphery of said discs in controlling forward and rearward progress of the vehicle, a pair of coil springs coupled with the brake shoe of each wheel, a manually actuated lever pivotally supported on a frame portion of the vehicle, means coupled with said lever and in operative engagement with at least one coil spring of each brake shoe simultaneously controlling positioning of the shoes through action of said lever from a neutral to a forward or rearward braking position, and said last named means comprising a flexible cable directly coupled with one of the springs of the brake shoe of the front wheel of the vehicle.

9. A brake system for vehicles having front and rear wheels, each wheel having a brake disc fixed thereto, a housing supported adjacent each wheel and concealing said discs, brake shoes pivotally supported in connection with said housings and having elements operatively engaging the periphery of said discs in controlling forward and rearward progress of the vehicle, a pair of coil springs coupled with the brake shoe of each wheel, a manually actuated lever pivotally supported on a frame portion of the vehicle, means coupled with said lever and in operative engagement with at least one coil spring of each brake shoe simultaneously controlling positioning of the shoes through action of said lever from a neutral to a forward or rearward braking position, the last named means for actuating the brake shoes of the rear wheels of the vehicle comprising a plurality of rods intercoupled through a link and lever and actuating a brake rod extending into the housings of each of the rear wheels, and means fixed to said last named rod within the housing operatively engaging both springs of each shoe arranged in said housing.

10. A brake system for vehicles having front and rear wheels, each wheel having a brake disc fixed thereto, a housing supported adjacent each wheel and concealing said discs, brake shoes pivotally supported in connection with said housings and having elements operatively engaging the periphery of said discs in controlling forward and rearward progress of the vehicle, a pair of coil springs coupled with the brake shoe of each wheel, a manually actuated lever pivotally supported on a frame portion of the vehicle, means coupled with said lever and in operative engagement with at least one coil spring of each brake shoe simultaneously controlling positioning of the shoes through action of said lever from a neutral to a forward or rearward braking position, the last named means for actuating the brake shoes of the rear wheels of the vehicle comprising a plurality of rods intercoupled through a link and lever and actuating a brake rod extending into the housings of each of the rear wheels, means fixed to said last named rod within the housing operatively engaging both springs of each shoe arranged in said housing, and said first named means also comprising a flexible cable directly coupled with one of the springs of the brake shoe of the front wheel of the vehicle.

11. A brake system for vehicles having front and rear wheels, each wheel having a brake disc fixed thereto, a housing supported adjacent each wheel and concealing said discs, brake shoes pivotally supported in connection with said housings and having elements operatively engaging the periphery of said discs in controlling forward and rearward progress of the vehicle, a pair of coil springs coupled with the brake shoe of each wheel, a manually actuated lever pivotally supported on a frame portion of the vehicle, means coupled with said lever and in operative engagement with at least one coil spring of each brake shoe simultaneously controlling positioning of the shoes through action of said lever from a neutral to a forward or rearward braking position, the last named means for actuating the brake shoes of the rear wheels of the vehicle comprising a plurality of rods intercoupled through a link and lever and actuating a brake rod extending into the housings of each of the rear wheels, means fixed to said last named rod within the housing operatively engaging both springs of each shoe arranged in said housing, and yieldable means operatively engaging said lever for retaining the same in said neutral and forward and rearward positions.

12. In a vehicle of the character described, employing a body member, a front wheel and a rear dual wheel unit, a brake system for the wheels of the vehicle, comprising brake discs fixed to all of the wheels of the vehicle, a housing supported adjacent each wheel and concealing said discs, brake shoes pivotally supported in connection with said housings and having elements operatively engaging the periphery of said discs in controlling forward and rearward progress of the vehicle, a pair of coil springs coupled with the brake shoes of each wheel, a manually actuated lever pivotally supported in connection with said body member, means coupled with said lever and in operative engagement with at least one coil spring of each brake shoe simultaneously controlling positioning of said shoes through action of said lever from a neutral to a forward and rearward braking position, said dual rear wheel unit being pivotally supported in connection with the rear end of the body member, and adjustable tension means in operative engagement with said dual rear wheel unit controlling action of the vehicle in different positions assumed by said manually actuated lever.

References Cited in the file of this patent

UNITED STATES PATENTS

| | | |
|---|---|---|
| 581,444 | Valentine | Apr. 27, 1897 |
| 1,303,110 | Pfleeger | May 6, 1919 |
| 2,177,793 | Taylor | Oct. 31, 1939 |
| 2,906,375 | Mossey | Sept. 29, 1959 |

FOREIGN PATENTS

| | | |
|---|---|---|
| 2,907 | Great Britain | of 1898 |